(12) United States Patent
Lee et al.

(10) Patent No.: US 8,333,877 B2
(45) Date of Patent: Dec. 18, 2012

(54) METHOD FOR MANUFACTURING AN ELECTRODE

(75) Inventors: Kun-Mu Lee, Yunlin County (TW); Yung-Liang Tung, Hualien County (TW)

(73) Assignee: Industrial Technology Research Institute, Hsinchu County (TW)

( * ) Notice: Subject to any disclaimer, the term of this patent is extended or adjusted under 35 U.S.C. 154(b) by 315 days.

(21) Appl. No.: 12/790,803

(22) Filed: May 29, 2010

(65) Prior Publication Data
US 2011/0100532 A1    May 5, 2011

(30) Foreign Application Priority Data
Oct. 29, 2009   (TW) ............... 98136629 A

(51) Int. Cl.
- C23F 17/00 (2006.01)
- C25D 15/00 (2006.01)
- C25D 13/02 (2006.01)
- C25D 1/14 (2006.01)

(52) U.S. Cl. ........ 204/484; 204/471; 204/483; 204/486; 204/496; 204/503; 204/508

(58) Field of Classification Search ............. 204/471, 204/483, 484, 486, 496, 503, 508
See application file for complete search history.

(56) References Cited

U.S. PATENT DOCUMENTS

| | | | |
|---|---|---|---|
| 6,858,158 B2 | 2/2005 | Chittibabu et al. | |
| 6,881,604 B2 | 4/2005 | Lindstrom et al. | |
| 6,900,382 B2 | 5/2005 | Chittibabu et al. | |
| 6,924,427 B2 | 8/2005 | Eckert et al. | |
| 6,929,970 B2 | 8/2005 | Andriessen et al. | |
| 6,949,400 B2 | 9/2005 | Ryan | |
| 7,094,441 B2 | 8/2006 | Chittibabu et al. | |
| 7,186,911 B2 | 3/2007 | Ryan | |
| 7,205,473 B2 | 4/2007 | Li et al. | |
| 7,224,036 B2 | 5/2007 | Kojima et al. | |
| 7,323,635 B2 | 1/2008 | Chittibabu et al. | |
| 7,422,922 B2 | 9/2008 | Morooka et al. | |
| 2007/0089783 A1* | 4/2007 | Jung et al. ............ 136/263 |

FOREIGN PATENT DOCUMENTS

| | | |
|---|---|---|
| CN | 1610987 A | 4/2005 |
| CN | 1763261 A | 4/2006 |
| CN | 1909261 A | 2/2007 |
| TW | 200932958 A | 6/2009 |

OTHER PUBLICATIONS

First examination opinion notification issued by China Intellectual Property Office on Mar. 5, 2012, for the above-referenced application's counterpart application in China (Application No. 200910211889.7).

Yamaguchi et al., "Highly efficient plastic substrate dye-sensitized solar cells using a compression method for preparation of TIO2 photoelectrodes", Chem. Commun., 2007, 4767-4769.

Lindstrom et al., "A new method to make dye-sensitized nanocrystalline solar cells at room temperature", Journal of Photochemistry and photobiology A: Chemistry 145 (2001) 107-112.

Matthews et al., "Electrophoretically Deposited Titanium Dioxide Thin Films for Photovoitaic Cells", Aust. J. Chem., 1994, 47, 1869-1877.

Mishra et al., "Metal-Free Organic Dyes for Dye-Sensitized Solar Cells: From Structure: Property Relationships to Design Rules", Angew. Chem. Int. Ed. 2009, 48, 2474-2499.

Zhang et al., "Polydisperse Aggregates of ZnO Nanocrystallites: A Method for Energy-Conversion-Efficiency Enhancement in Dye-Sensitized Solar Cells", Adv. Funct. Mater. 2008, 18, 1654-1660.

First examination opinion notification issued by the Taiwan Intellectual Property Office on Jun. 21, 2012, for the above-referenced application's counterpart application in Taiwan (Application No. 098136629 filed Oct. 29, 2009).

* cited by examiner

*Primary Examiner* — Bruce Bell
(74) *Attorney, Agent, or Firm* — Pai Patent & Trademark Law Firm; Chao-Chang David Pai

(57) ABSTRACT

Disclosed is a method to manufacture an electrode. The metal oxide of different sizes (or metal oxide secondary particle of similar size) is formed on a transparent substrate by electrophoresis deposition. Subsequently, the metal oxide layer is compressed and dipped in dye to complete an electrode applied in a solar cell. Furthermore, the step of dipping the metal oxide in dye can be earlier than the electrophoresis deposition, thereby reducing the dipping period and dipping temperature.

18 Claims, 3 Drawing Sheets

METHOD FOR MANUFACTURING AN ELECTRODE

CROSS REFERENCE TO RELATED APPLICATIONS

This Application claims priority of Taiwan Patent Application No. 098136629, filed on Oct. 29, 2009, the entirety of which is incorporated by reference herein.

BACKGROUND OF THE INVENTION

1. Field of the Invention

The present invention relates to dye sensitized solar cells, and in particular relates to the method for manufacturing the electrode thereof.

2. Description of the Related Art

Solar photocells are photoelectric semiconductor thin films directly powered by the solar light, and it immediately outputs voltage and current by exposed light. The solar photocell is usually called solar cell for short. The solar cell is a renewable green energy without producing harmful gas such as carbon dioxide during generating power, and it will not pollute the environment. The solar cells are classified to silicon-based semiconductor cell, dye sensitized solar cell, organic cell, and the likes corresponding to the materials. The most important factor of the solar cell is the photoelectric conversion yield. In the silicon based solar cells, the best conversion yields of the single crystalline silicon solar cell, the multi crystalline silicon solar cell, and the amorphous silicon solar cell are 29%, 24%, and 17%, respectively.

The dye sensitized solar cell (in abbreviate DSSC) is recently developed. Different from the typical photovoltage cell, the top substrate of the DSSC is usually glass or transparent flexible polymer foil. The glass has a transparent conductive oxide coated thereon, such as fluorinated tin oxide ($SnO_2$:F, in abbreviate FTO) or indium tin oxide (in abbreviate ITO). There is a nano-porous layer having a thickness of about 10 μm formed on the transparent conductive layer, wherein the nano-porous layer is generally composed of $TiO_2$ particles having a particle size diameter of about 10 nm to 20 nm. Subsequently, a dye layer such as ruthenium polypyridyl complex is coated on the nano-porous layer to complete so-called top substrate. The bottom substrate is usually glass or transparent flexible polymer foil, wherein the glass has a transparent conductive oxide layer such as FTO coated thereon. Furthermore, a platinum layer is plated on the transparent conductive layer to be the catalyst for the electrolyte reaction. An electrolyte containing iodonium is then injected to the space between the top and bottom substrates. Although the best conversion yield of the DSSC is only about 12%, the manufacture of the DSSC is simple and thereby largely reducing the mass production cost and the price of per kilowatt-hour.

U.S. Pat. No. 6,881,604 discloses a method of wet coating collocated with compression to prepare photoelectric electrode applied in the DSSC, but its conversion yield is only 3% under light intensity of 100 mW/cm².

Chem. Commun., 2007, 4767-4769 discloses that the $TiO_2$ of different particle size diameters is wet coated to form a $TiO_2$ film on ITO/PEN, and the $TiO_2$ film is then compressed by 100 MPa to enhance the linkage of the $TiO_2$ particles, thereby completing a working electrode. The best conversion yield of the DSSC including this working electrode may reach 7.4%, wherein the active area is 0.256 cm².

CN 1763261 discloses the $TiO_2$ being electrophoresis deposited on a cathode by appling a constant voltage, wherein the electrophoresis solution must include surfactant and metal salt. Thereafter, the electrode has to be treated by high temperature or microwave. However, the $TiO_2$ layer only has single particle size diameter distribution and needs to be dipped in the dye solution.

The conventional low temperature processes for preparing the electrode still exist some defects. For example, the slurry containing binder needs high temperature sintering to remove the organic, such that the slurry cannot be utilized in thermal stabless flexible substrates. Accordingly, the low temperature wet coating should additionally prepare complex slurry to avoid sintering process. As such, a novel method for manufacturing the electrode applied in solar cell is called for reducing the process time and cost.

BRIEF SUMMARY OF THE INVENTION

The invention provides a method for manufacturing an electrode, comprising providing a transparent substrate having a transparent conductive layer thereon; electrophoresis depositing a first metal oxide on the transparent layer; and electrophoresis depositing a second metal oxide on the first metal oxide; wherein the first metal oxide has a smaller particle size diameter than the second metal oxide.

The invention also provides a method for manufacturing an electrode, comprising providing a transparent substrate having a transparent conductive layer thereon; and electrophoresis depositing a first metal oxide secondary particle on the transparent conductive layer.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides a method for manufacturing an electrode. First, a first metal oxide is dispersed in an organic solvent to form a suspension. The solvent can be iso-propanol, ethanol, butanol, acetone, acetonitrile, or combinations thereof. The first metal oxide can be titanium oxide, zinc oxide, or indium tin oxide. In one embodiment, the first metal oxide has a particle size diameter of 5 nm to 50 nm. If the particle size diameter of the first metal oxide is too large, the adsorption amount of the dye will be too less to enhance the photoelectric current. If the particle size diameter of the first metal oxide is too small, the channel between the deposited first metal oxide will be too small to be penetrated by the dye and the electrolyte. If the concentration of the first metal oxide in the suspension is too high, the particles will easily aggregate to precipitate. If the concentration of the first metal oxide in the suspension is too low, the particles will be too less to be deposited for forming a film.

Figure 1:
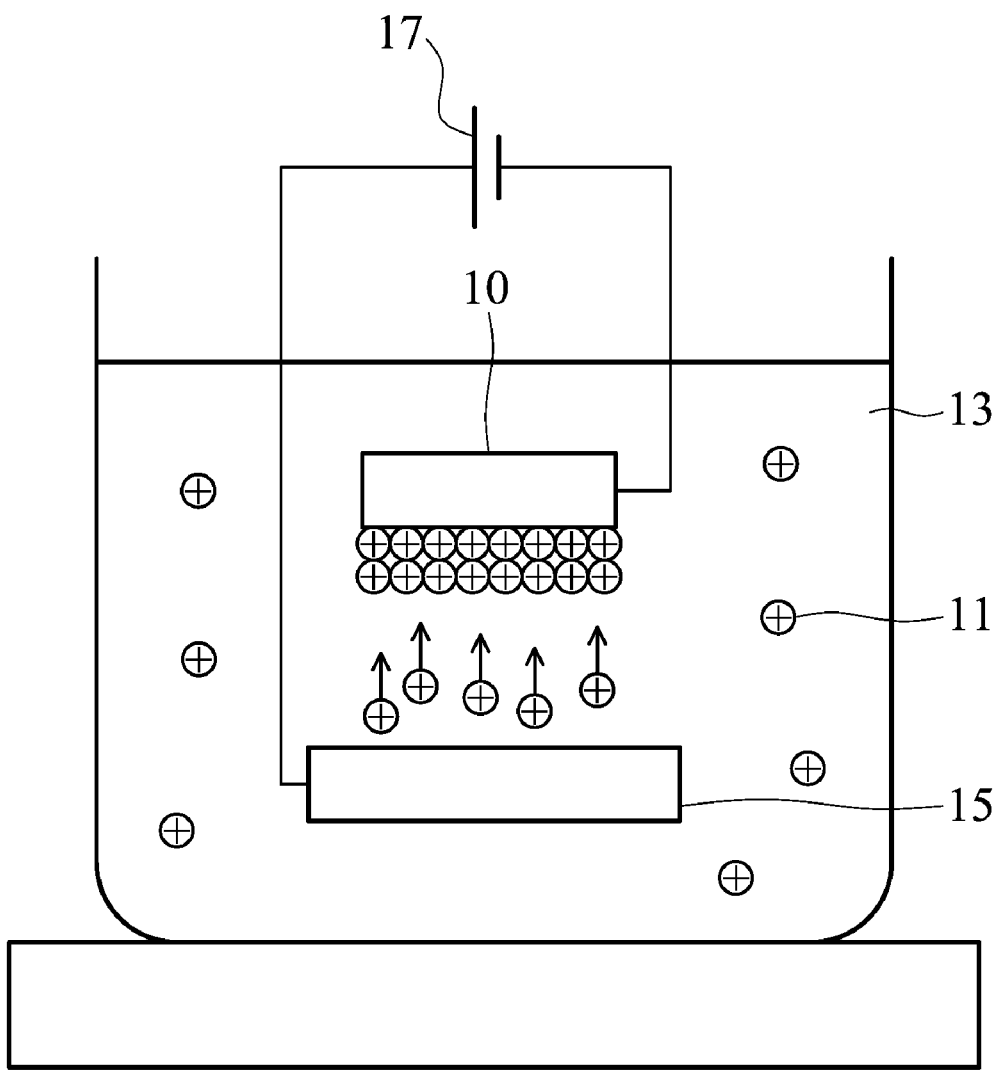
FIG. 1 is a diagram showing the electrophoresis deposition in the invention.

As shown in FIG. 1, a transparent substrate 10 having a transparent conductive layer coated thereon is then charged in the suspension 13 of the first metal oxide 11 to be a cathode, another conductor 15 is charged in the suspension 13 to be the anode, and a current 17 is applied to process electrophoresis deposition for a period, such that the first metal oxide 11 is deposited on the transparent conductive layer. The suitable transparent substrate of the invention includes rigid materials such as glass or flexible materials such as plastic or synthetic resin. The described conductive layer can be indium tin oxide, zinc oxide, fluorinated tin oxide, aluminum zinc oxide, zinc gallium oxide, or combinations thereof. The conductive layer can be formed on the transparent substrate by chemical vapor deposition or sputtering. In one embodiment, the transparent conductive layer has a thickness of 50 nm to 500 nm. If the transparent conductive layer is too thin, the light transmittance will be higher; however, the sheet resistance will be too low and therefore lowering the electrical fill factor. If the transparent conductive layer is too thick, the sheet resistance will be enhanced, but the light transmittance will be lowered and therefore lowering the photoelectric current of the solar cell. The suitable conductor served as the anode of the electrophoresis deposition includes fluorinated tin oxide, indium tin oxide, zinc oxide, aluminum zinc oxide, zinc gallium oxide, or combinations thereof. The selection of the conductor should prevent to produce metal ions and interference the electrophoresis deposition. The electrophoresis deposition is processed in constant current rather than constant voltage, such that the deposition rate is not influenced by the deposition thickness. The constant current of the electrophoresis deposition is a direct current of 0.01 mA/cm$^2$ to 1 mA/cm$^2$. If the current is too less, it will be difficult to deposit for forming the film. If the current is too large, the quickly deposited particles will be loosely packed to influence the film properties. The electrophoresis deposition has a period less than 5 minutes, and the longer period will make too thick film that is easily peeled during dry process.

After the electrophoresis deposition, the metal oxide layer can be compressed to increase the linkage between the particles of the metal oxide layer, thereby forming channels having suitable size and reducing the thickness of the metal oxide layer. As such, the electrolyte easily diffuses and/or penetrates the metal oxide layers. The compression has a pressure of 20 MPa to 700 MPa for a period of 1 second to 5 minutes by twin roller continuous type. If the compression pressure is too low and/or the compression period is too short, the linkage between the particles will be too weak and the channel between the particles will be too large, thereby increasing the electron recombination chance. If the compression pressure is too high and/or the compression period is too long, the channel between the particles will be too small. Although this may reduce the electrode thickness, it is difficult to diffuse the dye and penetrate the electrolyte.

Subsequently, a second metal oxide is dispersed in an organic solvent to form a suspension. The solvent includes iso-propanol, ethanol, acetone, or combinations thereof. The second metal oxide can be titanium oxide, zinc oxide, or indium tin oxide. In one embodiment, the second metal oxide and the first metal oxide are composed of same material. In one embodiment, the second metal oxide has a particle size diameter of 50 nm to 200 nm. If the second metal oxide particle size diameter is too large, it will be difficult to process the electrophoresis deposition. If the second metal oxide particle size diameter is too small, its light scattering effect will be too low to enhance the photoelectric current. If the concentration of the second metal oxide in the suspension is too high, the particles will easily aggregate to precipitate. If the concentration of the second metal oxide in the suspension is too low, the particles will be too less to deposit for forming a film.

Subsequently, the transparent substrate has the first metal oxide layer deposited thereon is charged in the suspension of the second metal oxide to process electrophoresis deposition, thereby depositing the second metal oxide on the first metal oxide layer. The electrophoresis deposition can be referred to FIG. 1. Note that the second metal oxide must have a greater particle size diameter than the first metal oxide. While light transmits through the transparent substrate and the transparent conductive layer, it will firstly contacts the layer of the first metal oxide having smaller particle size diameter, and then contacts the layer of the second metal oxide having larger particle size diameter. After the light being scattered by the second metal oxide, the light of long wavelength will be efficiently utilized. While a full spectrum light such as solar light enters a solar cell, the shorter wavelength light such as blue light has shorter transmittance distance compared to longer wavelength light such as red light. In the invention, when the shorter wavelength light having stronger intensity moves through the first metal oxide, it is easily absorbed by the dye. On the other hand, when the longer wavelength light having weaker intensity moves through and scattered by the second metal oxide, its absorption is improved due to its light path in the electrode is extended by the scattering. If the first metal oxide has a larger particle size diameter than the second metal oxide, the short wavelength light cannot match the second metal oxide far away from the substrate, and the long wavelength light cannot match the first metal oxide close to the substrate. Therefore, the utilizable wavelength region of the visible light cannot be broadened by the solar cell.

Subsequently, the deposited second metal layer can be compressed to prepare an electrode having good adhesion. The compression has a pressure of 20 MPa to 700 MPa for 1 second to 5 minutes by twin roller continuous type. If the compression pressure is too low and/or the compression period is too short, the linkage between the particles will be too weak and the channel between the particles will be too large, thereby increasing the electron recombination chance. If the compression pressure is too high and/or the compression period is too long, the channel between the particles will be too small. Although it may reduce the electrode thickness, it is difficult to diffuse the dye and penetrate the electrolyte. In one embodiment, the compression is processed after every electrophoresis deposition. In another embodiment, most of the solvent is easily removed by controlling the evaporation rate between different electrophoresis depositions, and the compression is only processed after completing all electrophoresis depositions.

Note that the described electrophoresis depositions are only processed for 2 times, however, one skilled in the art may process the electrophoresis deposition for several times to form several metal oxide layers composed of different particle size diameter distributions if necessary. Whatever the times of electrophoresis deposition are adopted, the later-formed metal oxide must have larger particle size diameter than the former-formed metal oxide to match the transmittance distance of incident light with different wavelengths.

At last, the substrate having the first and second metal oxide layers deposited thereon is dipped in a dye solution, such that the dye is adsorbed on the metal oxide surface. This is so-called chemical adsorption, and the covalent bonding is formed between the dye and the metal oxide. The dye dipping process is processed at about 60° C. for about 2 hours. The dye can be cis-di(thiocyanato)bis(2,2'-bipyridyl-4,4'-dicarboxylate)ruthenium (II) (in abbreviate N3), cis-bis(isothiocyanato)bis(2,2'-bipyridyl-4,4'-dicarboxylato)-ruthenium (II)bis-tetrabutylammonium (in abbreviate N719), or other non-metal organic dye referring to Angew. Chem. Int. Ed. 2009, 48, 2474-2499. The solvent for dissolving the dye can be co-solvent of acetonitrile and butanol (v/v=1/1). The dye solution has a concentration of $10^{-4}$M to $10^{-3}$M. As known in experiments, the amount of the dye adsorbed on the metal oxide surface during constant period is determined by the dye solution concentration. Subsequently, the metal oxide surface is washed by acetonitrile to remove non-adsorbed dye, and then dried to obtain a photo electrode applied in a dye sensitized solar cell.

In the described method, the major steps such as electrophoresis, compression, and dye dipping are processed at about room temperature. Compared to the conventional art, the problems come from high temperature treatments of wet coating method are approximately solved by the invention. In addition, the multi-layered structure of the metal oxides having different particle size diameter distributions has better effect than the single-layered structure of the metal oxide having only one particle size diameter distribution.

In another embodiment, the dye is firstly dissolved to form a dye solution, and the first metal oxide is then charged in the dye solution at room temperature, such that the dye is adsorbed on the first metal oxide surface. The first metal oxide having dye adsorbed on its surface is collected by centrifugal method, and then dispersed in a solvent such as iso-propanol to form a suspension for following electrophoresis deposition. Similar to described steps, the second metal oxide is charged in the dye solution at room temperature, such that the dye is adsorbed on the second metal oxide surface. The second metal oxide having dye adsorbed on its surface is collected by centrifugal method, and then dispersed in a solvent such as iso-propanol to form a suspension for following electrophoresis deposition. After compressing the layers of first and second metal oxides having dye adsorbed on their surface, the working electrode is completed. Because the dye is adsorbed on the first and second metal oxide surface before the electrophoresis deposition, there is no demand to dipping the substrate in the dye solution after the electrophoresis deposition. Because the dye is quickly adsorbed on the surface of the first and second metal oxides directly charged in the dye solution, the pre-adsorbing method may save much time. For example, dipping the substrate in the dye after electrophoresis deposition should be processed at about 60° C. for about 2 hours to complete the dye adsorption. On the other hand, directly dispersing the metal oxide in the dye solution is processed at room temperature for only 5 minutes to 10 minutes to complete the dye adsorption.

Figure 2:
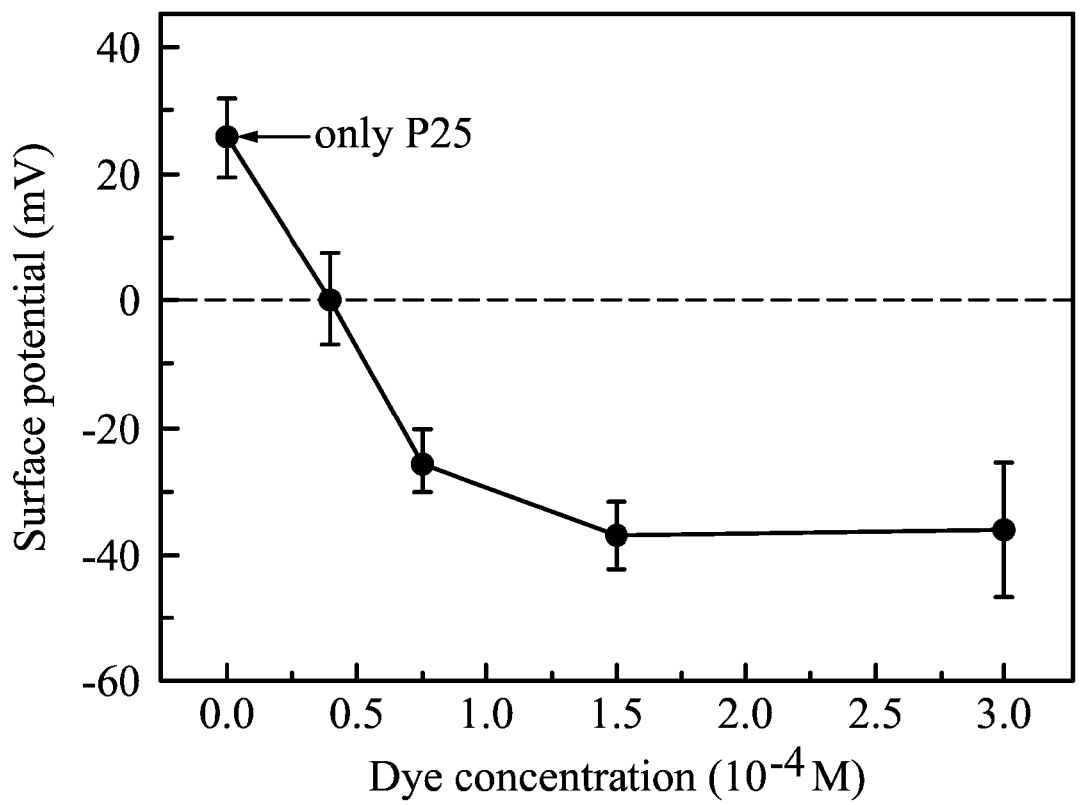
FIG. 2 is the curve showing the surface potential of the $TiO_2$ dipped in dye solutions of different concentration.

Alternatively, the metal oxide surface potential can be tuned by the dye amount adsorbed on the metal oxide surface. As shown in FIG. 2, the surface potential of the TiO$_2$ particle having a particle size diameter of 25 nm is +25 mV (in iso-propanol). After dipping the TiO$_2$ particle in the N719 dye solutions of $0.4\times10^{-4}$M, $0.75\times10^{-4}$M, $1.5\times10^{-4}$M and $3.0\times10^{-4}$M, respectively, its surface potential is 0, −24 mV, −40 mV and −40 mV, respectively. As described above, the surface potential of the metal oxide is reduced even to minus corresponding to the dye adsorption amount. Therefore, the transparent substrate having the transparent conductive layer coated thereon is not only served as a cathode but also served as an anode in this electrophoresis deposition process, it is determined by the dye adsorption amount on the metal oxide surface.

In a further embodiment, the first metal oxide firstly forms a secondary particle. The material selection of the first metal oxide is similar to above and omitted here. The formation of the secondary particle can be referred to Adv. Funct. Mater. 2008, 18, 1654-1660, wherein small first metal oxide having a particle size diameter of 10 nm to 20 nm aggregates to large secondary particle having a particle size diameter of 100 nm to 400 nm. If the particle size diameter of the secondary particle is too large, it will be disadvantageous to electrophoresis deposit. If the particle size diameter of the secondary particle is too less, it cannot efficiently scatter the light. The secondary particle has small particle size diameter properties and large particle size diameter properties simultaneously. The secondary particle is charged in a solvent to form a suspension. The described transparent substrate having the transparent conductive layer is charged in the suspension, and a constant current is applied to electrophoresis depositing the secondary particle on the transparent conductive layer. The secondary particle layer has a thickness of 5 μm to 20 μm. If the secondary particle layer is too thin, it will provide too low photoelectric current. If the secondary particle layer is too thick, the electrode will be easily peeled.

Similar to above embodiment, the secondary particle layer can be compressed to increase the linkage between the secondary particles. Alternatively, dipping the secondary particle in the dye solution can be earlier or later than the electrophoresis deposition. In a preferably embodiment, the secondary particle is firstly dipped in the dye solution to adsorb the dye on its surface, and then electrophoresis deposited on the conductive layer of the transparent substrate, thereby saving the time of dipping in the dye solution. Similarly, the dye adsorption amount on the secondary particle surface will reduce the secondary particle surface potential. As such, the transparent substrate having the transparent conductive layer coated thereon can be served as a cathode or an anode in the electrophoresis deposition according to the dye adsorption amount on the secondary particle surface.

EXAMPLES

Example 1

0.25 g of TiO$_2$ having a particle size diameter of 18 nm (P90, commercially available from Degussa) was charged in 1 L of iso-propanol to from a suspension. A plastic substrate having an ITO layer coated thereon (1.5 cm×4 cm, commercially available from Peccell) was charged in the suspension to be a cathode, a FTO layer was charged in the suspension to be an anode, and 0.1 mA of constant current was applied to process an electrophoresis deposition for 2.5 minutes, such that a TiO$_2$ layer was formed on the ITO layer.

0.25 g of TiO$_2$ having a particle size diameter of 50 nm to 100 nm (self synthesized) was charged in 1 L of iso-propanol to form a suspension. The plastic substrate having the TiO$_2$ layer deposited thereon was charged in the suspension to be a cathode, the FTO layer was charged in the suspension to be an anode, and 0.1 mA of constant current was applied to process an electrophoresis deposition for 2.5 minutes, such that another TiO$_2$ layer was formed on the pre-deposited TiO$_2$ layer.

Subsequently, the plastic substrate having two TiO$_2$ layers deposited thereon was directly compressed by 300 MPa for 30 seconds to enhance the linkage between the particles of the TiO$_2$ layers. Thereafter, the substrate was dipped in a dye (N719, commercially available from Peccell) solution of $3\times10^{-4}$M at 60° C., such that the dye N719 was adsorbed on the TiO$_2$ surface to complete a working electrode. The working electrode and an opposite electrode plated by platinum were adhered by 60 μm of hot melt glue, wherein the space between these two electrodes was injected an electrolyte containing $I^-/I_3^-$ to obtain a solar cell with a sandwich structure. The solar cell was exposed under a solar simulator, fit the IEC 60904, to measure its I-V curves for calculating its photoelectric conversion yield (6%).

Figure 3:
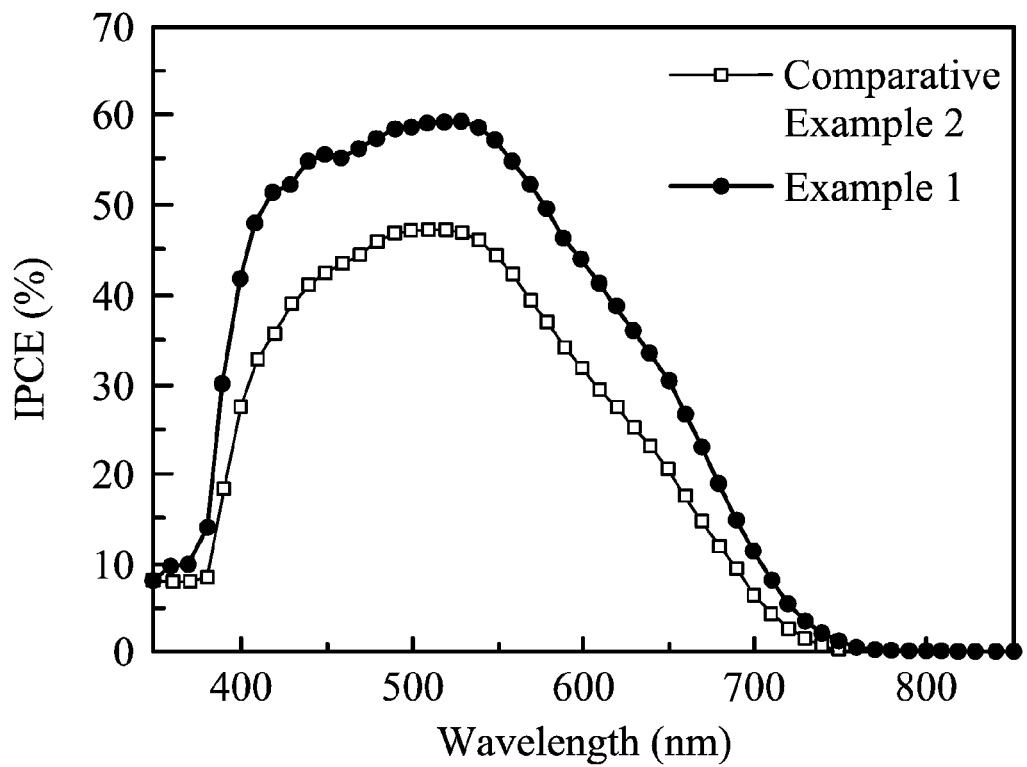
FIG. 3 shows the IPCE versus different wavelength curves of the solar cells in Example 1 and Comparative Example 2.

In addition, the incident photon to charge carrier efficiency (in abbreviate IPCE) curves corresponding to different wavelengths of the solar cell were shown in FIG. 3.

Comparative Example 1

0.25 g of $TiO_2$ having a particle size diameter of 18 nm (P90, commercially available from Degussa) was charged in 1 L of iso-propanol to from a suspension. A plastic substrate having an ITO layer coated thereon (1.5 cm×4 cm, commercially available from Peccell) was charged in the suspension to be a cathode, a FTO layer was charged in the suspension to be an anode, and 0.1 mA of constant current was applied to process an electrophoresis deposition for 5 minutes, such that a $TiO_2$ layer was formed on the ITO layer. Subsequently, the plastic substrate having the $TiO_2$ layers deposited thereon was compressed by 300 MPa for 30 seconds to enhance the linkage between the particles of the $TiO_2$ layer. Thereafter, the substrate was dipped in a dye (N719, commercially available from Peccell) solution of $3\times10^{-4}$ M at 60° C., such that the dye N719 was adsorbed on the $TiO_2$ surface to complete a working electrode. The working electrode and an opposite electrode plated by platinum were adhered by 60 μm of hot melt glue, wherein the space between these two electrodes was injected an electrolyte containing $I^-/I_3^-$ to obtain a solar cell with a sandwich structure. The solar cell was exposed under a solar simulator, fit the IEC standard, to measure its I-V curves for calculating its photoelectric conversion yield (3%).

Comparative Example 2

0.25 g of $TiO_2$ having a particle size diameter of 50 nm to 100 nm (self synthesized) was charged in 1 L of iso-propanol to form a suspension. The plastic substrate having the ITO layer coated thereon was charged in the suspension to be a cathode, the FTO layer was charged in the suspension to be an anode, and 0.1 mA of constant current was applied to process an electrophoresis deposition for 5 minutes, such that a $TiO_2$ layer was formed on the ITO layer.

Subsequently, the plastic substrate having the $TiO_2$ layers deposited thereon was directly compressed by 300 MPa for 30 seconds to enhance the linkage between the particles of the $TiO_2$ layers. Thereafter, the substrate was dipped in a dye (N719, commercially available from Peccell) solution of $3\times10^{-4}$ M at 60° C., such that the dye N719 was adsorbed on the $TiO_2$ surface to complete a working electrode. The working electrode and an opposite electrode plated by platinum were adhered by 60 μm of hot melt glue, wherein the space between these two electrodes was injected an electrolyte containing $I^-/I_3^-$ to obtain a solar cell with a sandwich structure. The incident photon to charge carrier efficiency (in abbreviate IPCE) curves corresponding to different wavelengths of the solar cell were shown in FIG. 3.

Example 2

0.25 g of $TiO_2$ having a particle size diameter of 18 nm (P90, commercially available from Degussa) was charged in a dye (N719, commercially available from Peccell) solution of $1.5\times10^{-4}$ M for 5 minutes to adsorb a dye layer on the $TiO_2$ surface. Subsequently, the $TiO_2$ adsorbing dye on its surface was collected by centrifugal method, and then dispersed in iso-propanol to form a suspension. A plastic substrate having an ITO layer coated thereon (1.5 cm×4 cm, commercially available from Peccell) was charged in the suspension to be a cathode, a FTO layer was charged in the suspension to be an anode, and 0.1 mA of constant current was applied to process an electrophoresis deposition for 2.5 minutes, such that a layer of $TiO_2$ absorbing the dye was formed on the ITO layer.

0.25 g of $TiO_2$ having a particle size diameter of 50 nm to 100 nm (self synthesized) was charged in a dye (N719, commercially available from Peccell) solution of $1.5\times10^{-4}$ M for 5 minutes to adsorb a dye layer on the $TiO_2$ surface. Subsequently, the $TiO_2$ adsorbing dye on its surface was collected by centrifugal method, and then dispersed in iso-propanol to form a suspension. A plastic substrate having the layer of $TiO_2$ absorbing the dye was charged in the suspension to be an anode, a FTO layer was charged in the suspension to be a cathode, and 0.1 mA of constant current was applied to process an electrophoresis deposition for 2.5 minutes, such that another layer of $TiO_2$ absorbing the dye was formed on the pre-deposited layer of $TiO_2$ absorbing the dye.

Subsequently, the plastic substrate having the layers of $TiO_2$ absorbing the dye deposited thereon was compressed by 300 MPa for 30 seconds to enhance the linkage between the particles of the layers of $TiO_2$ absorbing the dye, thereby completing a working electrode. The working electrode and an opposite electrode plated by platinum were adhered by 60 μm of hot melt glue, wherein the space between these two electrodes was injected an electrolyte containing $I^-/I_3^-$ to obtain a solar cell with a sandwich structure. The solar cell was exposed under a solar simulator, fit the IEC 60904, to measure its I-V curves for calculating its photoelectric conversion yield (3%).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for manufacturing an electrode, comprising:
providing a transparent substrate having a transparent conductive layer thereon;
electrophoresis depositing a first metal oxide on the transparent conductive layer;
electrophoresis depositing a second metal oxide on the first metal oxide; and
performing a compressing process after electrophoresis depositing the first metal oxide and/or electrophoresis depositing the second metal oxide,
wherein the first metal oxide has a smaller particle size diameter than the second metal oxide.

2. The method as claimed in claim 1, wherein the transparent substrate comprises glass, plastic, or synthetic resin.

3. The method as claimed in claim 1, wherein the transparent conductive layer comprises indium tin oxide, zinc oxide, fluorinated tin oxide, aluminum zinc oxide, zinc gallium oxide, or combinations thereof.

4. The method as claimed in claim 1, wherein the steps of electrophoresis depositing the first and second metal oxide are processed in constant current.

5. The method as claimed in claim 1, wherein the first metal oxide has a particle size diameter of 5 nm to 50 nm, and the second metal oxide has a particle size diameter of 50 nm to 200 nm.

6. The method as claimed in claim 1, wherein the first and second metal oxides comprise titanium oxide, zinc oxide, or indium tin oxide.

7. The method as claimed in claim 1, further dipping the first and second metal oxides in a dye solution, respectively, to form a dye layer on the first and second metal oxides, respectively, before electrophoresis depositing the first and second metal oxides.

8. The method as claimed in claim 1, further dipping the first and second metal oxides in a dye solution after electrophoresis depositing the second metal oxide.

9. The method as claimed in claim 1, wherein the electrode is applied in a dye sensitized solar cell.

10. A method for manufacturing an electrode, comprising:
providing a transparent substrate having a transparent conductive layer thereon;
electrophoresis depositing a first metal oxide secondary particle on the transparent conductive layer; and
performing a compressing process after electrophoresis depositing the first metal oxide secondary particle.

11. The method as claimed in claim 10, wherein the transparent substrate comprises glass, plastic, or synthetic resin.

12. The method as claimed in claim 10, wherein the transparent conductive layer comprises indium tin oxide, zinc oxide, fluorinated tin oxide, aluminum zinc oxide, zinc gallium oxide, or combinations thereof.

13. The method as claimed in claim 10, wherein the step of electrophoresis depositing the first metal oxide secondary particle is processed in constant current.

14. The method as claimed in claim 10, wherein the first metal oxide has a particle size diameter of 10 nm to 20 nm, and the secondary particle has a particle size diameter of 100 nm to 400 nm.

15. The method as claimed in claim 10, wherein the first metal oxide comprises titanium oxide, zinc oxide, or indium tin oxide.

16. The method as claimed in claim 10, further dipping the first metal oxide secondary particle in a dye solution to form a dye layer on the first metal oxide secondary particle before electrophoresis depositing the first metal oxide secondary particle.

17. The method as claimed in claim 10, further dipping the first metal oxide secondary particle in a dye solution after electrophoresis depositing the first metal oxide secondary particle.

18. The method as claimed in claim 10, wherein the electrode is applied in a dye sensitized solar cell.

* * * * *